United States Patent [19]
Kato

[11] 3,857,381
[45] Dec. 31, 1974

[54] FRYING PAN SPLASH SHIELDING DEVICE

[76] Inventor: Kyosuke Kato, 58-21, Gejo-cho, Kasugai City, Aichi Prefecture, Japan

[22] Filed: Mar. 29, 1974

[21] Appl. No.: 455,962

[52] U.S. Cl................ 126/384, 126/386, 220/44 A
[51] Int. Cl........................ B65d 51/02, A47j 27/58
[58] Field of Search........... 126/383, 384, 385, 386; 220/44 A, 24 R; 99/444

[56] References Cited
UNITED STATES PATENTS

| | | | |
|---|---|---|---|
| 1,477,981 | 12/1923 | Sechler | 126/384 X |
| 2,488,215 | 11/1949 | Mayne | 126/383 X |
| 2,614,718 | 10/1952 | Loop | 220/44 A X |
| D168,026 | 10/1952 | Fornoff | 220/24 R X |

FOREIGN PATENTS OR APPLICATIONS

| | | | |
|---|---|---|---|
| 764,780 | 5/1934 | France | 126/384 |
| 20,030 | 7/1910 | Great Britain | 126/384 |

Primary Examiner—William F. O'Dea
Assistant Examiner—Harold Joyce
Attorney, Agent, or Firm—Fred C. Philpitt; W. Robert Baylor

[57] ABSTRACT

A splash shielding device for a food frying pan comprising a pan proper, and a hood, which latter covering the entire open area of the pan proper, is provided with a transparent portion that allows the pan interior to be observed in its side wall; a means for allowing foods for processing to be introduced or removed, in the side wall; a vent means for discharging the oil fume, water vapor and other gas produced inside the pan during the frying process; a rack means for temporarily keeping the fried foods for draining oil off; and an oil return means for returning the drained oil from the rack means to the pan.

5 Claims, 3 Drawing Figures

PATENTED DEC 31 1974 3,857,381

FRYING PAN SPLASH SHIELDING DEVICE

BACKGROUND OF THE INVENTION

The present invention relates to a splash shielding device for a frying pan, and more particularly to a hooded frying pan for shielding splashes of oil thrown around during a food frying process in edible oil or fat in the pan, said hood covering the entire open area of the pan proper, said hood being provided with a transparent portion for enabling the pan interior to be observed in its side wall; a door means for facilitating the introduction and removal of the foods for processing, in the side wall; a vent means for discharging the oil fume, water vapor and other gas produced inside the pan during the frying process; a rack means for temporarily keeping the fried foods for draining oil off; and an oil return means for returing the drained oil from the rack means to the pan.

In a conventional food frying process utilizing edible oil or fat such as tempura, because succulent foods are suddenly immersed in hot oil or fat, a physical phenomenon of violent boiling of the water contained in the foods in the edible oil or fat takes place, producing splashes which reaches to a considerable distance from the pan, thereby not only contaminating the kitchen but also sometimes inflecting burns to the frying personnel in the hands and face. In order to prevent such splashing of oil or fat, there have been conventionally utilized several methods such as: a thin shielding screen made of aluminum foil or similar material which is installed around the frying pan to a substantial height; a doughnut shaped metal disc which is put on the frying pan; and a metal hood made in the form of a doughnut with its rear portion provided with an extension projecting over the central portion of the frying pan installed around the pan. However, because all these conventional methods provide a shielding only over a portion of the entire open area of the frying pan, a substantial portion of the splashes is thrown outside the pan through the un-shielded area, with the result that the shielding effects of these conventional methods are insufficient in as much as the splash is totally unobstructed in the direction towards the cooking personnel's hands and face and in the vertical upward direction. In the present invention, all these problems are successfully solved.

SUMMARY OF THE INVENTION

An object of the present invention is to prevent the splashes of oil generated in the pan from being thrown outside by means of a shielding hood that completely covers the entire opening area of the pan proper.

Another object of the present invention is to prevent failures of cooking by allowing a sufficient and complete observation of the cooking process inside the pan to be obtained by the cooking personnel with said hood installed in place, through a transparent portion provided in the side wall of said hood.

A further object of the present invention is to prevent the interior of the hood from being filled with oil fume and vapor to such an extent that a reasonable observation of the cooking process is obstructed and that the hood interior become sufficiently hot to catch fire, by building a vent means that is so constructed that oil fume, water vapor and other gas are discharged to the outside but oil splashes are prevented from being thrown outside, in the top wall of the hood.

Still another object of the present invention is to enable the fried foods to be drained off without getting cooled, by providing a draining rack means for temporarily storing the fried food on the top of the hood.

a still further object of the present invention is to reduce the oil decrease in the pan to a minimum by providing a oil drip return means in the hood wall for returning oil drops draining from said rack means to the pan proper.

A still further object of the present invention is to facilitate the loading and unloading of the pan with foods by providing a door means that can be easily closed while no food passes through and that is installed in one portion of the side wall of the hood.

A still further object of the present invention is to facilitate the discharge effect of the oil fume and water vapor generated in the pan by providing a space between the bottom edge of the hood and the pan periphery through which external air can be introduced into the pan interior.

In summary, the present invention relates to a device comprising a food frying pan having an open top area and a hood mounted on the pan and covering the open top area; the hood including a frame structure, a conically-shaped side wall member and a conically-shaped top wall member, the frame structure having an upper portion and a lower portion, the lower frame portion having a U-shaped channel surrounding the pan, the lower edge of the side wall member being supported in the U-shaped channel of the lower frame portion, the side wall member having a transparent portion for allowing the interior of the device to be viewed, the side wall member having an opening forming a passage therethrough for allowing food to be introduced or removed therefrom, a door member hingedly mounted on the side wall member for closing the food passage opening, the top wall member attached to the upper frame portion, the top wall member having a central opening, a disc member mounted in a suspended manner from the top wall member, a first vent passage formed between the outside edge of the top wall member and the edge of the upper frame portion for discharging the fumes and moisture produced within the interior of the device to the exterior thereof, and a second vent passage formed between the central opening of the top wall member and the disc member for also discharging the fumes and moisture produced within the interior of the device to the exterior thereof; rack means installed substantially parallel to and superimposed on the top wall member and adapted to drain oil drippings from the fried food temporarily placed thereon; and oil dripping return means associated with the device and utilizing the inclined surface of the top wall member for returning the dripping oil from the rack means to the oil bath in the pan.

DETAILED DESCRIPTION OF THE INVENTION

The pan proper related to the present invention generally indicated by a latter P in these drawings is covered over its entire area with a hood C which comprises a frame F that is assembled with an appropriate height, a side guarding side wall member 1 having a door means adapted to let foods go through inwardly and outwardly, and a top guarding wall member 2 having a vent means and an oil return means, whereby the entire open area of the pan proper P is covered by said hood C embracing a space of proper height, said frame F additionally being provided with a rack means at its top.

Figure 1:
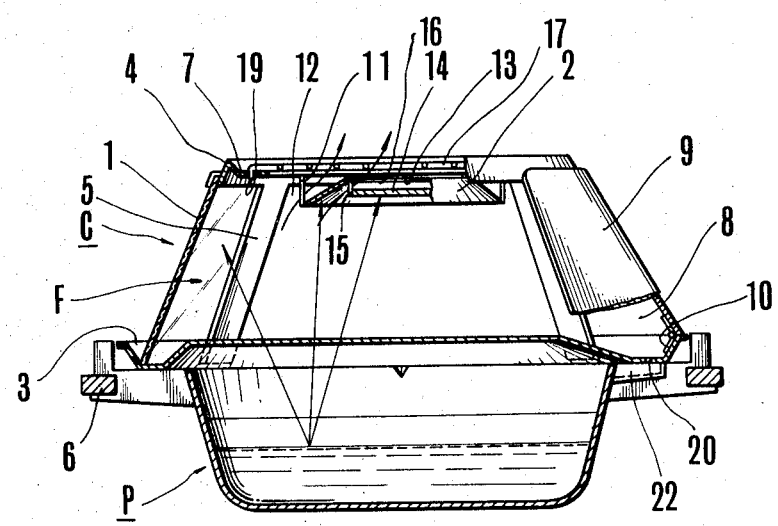
FIG. 1 is a vertical cross sectional view showing a hood of the present invention in the proper position on a pan proper.

As shown in FIG. 1, the frame F included in the structure of the hood C is formed in a frustum form comprising a lower frame 3, upper frame 4 and a plurality of struts 5. The lower frame 3 is made slightly larger in its diameter than the outside diameter of the pan, and rests on the gripping portions 6 of the pan proper P, thereby providing a space between the outside periphery of the pan proper P and the lower frame 3 for introducing external air into the interior of the pan proper P. The upper frame 4 is smaller in its diameter than the lower frame 3, and is formed with a downwardly turned outside periphery portion and a horizontally inwardly projecting inside edge portion 7.

Figure 2:
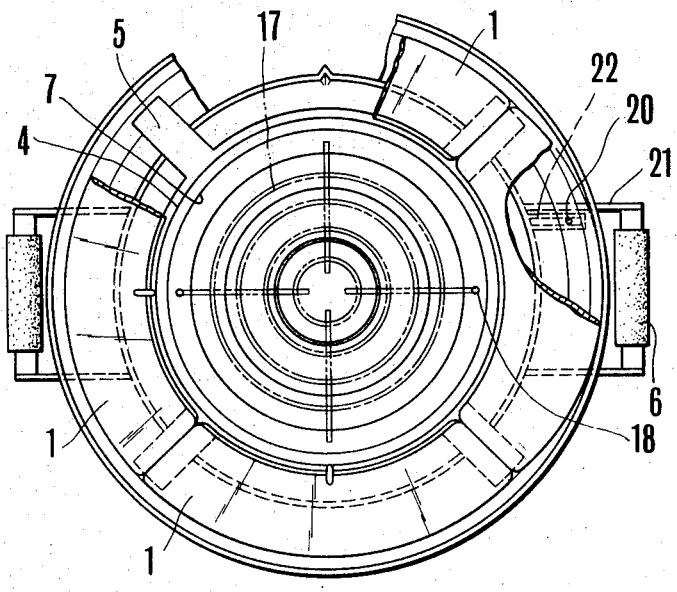
FIG. 2 is a top plan view showing the hood installed on the pan, with a part of the hood cut away.

The side portion of the frame F is, as shown in FIGS. 1 and 2, surrounded by a side wall member 1, which is made of transparent glass so as to allow the interior of the hood C to be viewed through. In one portion of the hood C, there is provided an opening forming a food passage 8 which is provided with a door 9, which is so connected to the lower frame 3 of the frame F by a hinge 10 and so free at the right side, left side, and top side that it can be swivelled forward for opening and can be leaned on the slant side surface of the frame F for closing the food passage opening 8, as shown in FIG. 2.

As shown in FIG. 1, the top wall 2 is formed as a conical cylinder having a very wide angle, and is so suspended from the upper frame 4 of the frame F at an appropriate distance therefrom by a plurality of suspension rods 11 that there is a vent passage 12 formed between the outside periphery of the top wall 2 and the upper frame 4 of the frame F for discharging the oil fume and water vapor produced inside the hood C. Underneath the central opening 13 of the top wall 2, a disc 14 is so suspended at an appropriate distance therefrom by a plurality of suspension rods 15 that there is a vent passage 16 formed between the opening 13 of the top wall 2 and the disc 14. The outside diameter of said top wall 2 is so made slightly larger than the inside diameter of the upper frame 4 of the frame F, that splashes can not be thrown through the vent passage 12 out of the hood C.

The rack means installed on the top of the hood C is formed of a plurality of lattice plates 17 assembled in a lattice form as shown in FIGS. 1 and 2 in dash lines, and is installed on the upper frame 4, which installation is effected by engaging a plurality of downwardly projecting dowels 19 provided on the periphery of the lattice plates 17 into a plurality of holes 18 correspondingly provided around the circular edge portion 7 of the upper frame 4.

Figure 3:
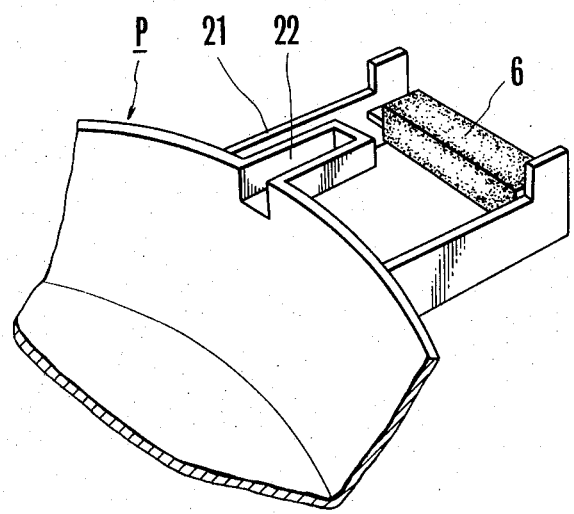
FIG. 3 is a partial enlarged oblique view showing the oil return channel provided in the neighborhood of the grip handle of the pan proper.

The lower frame 3 of the frame F is, as shown in FIG. 1, formed in the form of a U-channel, in which a through hole 20 is opened in one location. There is an oil return channel 22 between two support arms 21 of one of the two grip handles 6 of the pan proper P, as shown in FIG. 3. When the hood C is so mounted on the pan proper P that the through hole 20 in the U channel of the lower frame 3 of the frame F is positioned directly above said oil return channel 22 located between the two support arms 21 of said grip handle 6, the oil splashes dripping down the side wall member 1 are received by the lower frame 3 and the collected oil is eventually returned to the pan proper P via the through hole 20 and the oil return channel 22.

When a frying pan splash shielding device according to the present invention is employed in an actual cooking process, for loading and unloading the pan with foods, the door means 9 is kept open as shown in FIG. 1, and while no loading or unloading operation takes place, said door means 9 is leaned on the sloped side surface of the hood C to close the passage opening in the hood C. Because the side wall member 1 is made of transparent glass, the inside of the hood C can be observed and the cooking process can be watched with sufficiently clear view, even with the door means 9 closed. Because the hood C completely covers the whole open area of the pan proper P, all oil splashes produced inside the pan proper P are shielded by the side wall member 1 and the top wall member 2 and therefore completely prevented from flying outside the hood C. However, all oil fume and water vapor produced inside the hood C is discharged through the vent passages 12 and 16 as shown by the arrow lines, thus keeping the inside of the hood C in a condition suitable for observation through the side wall member 1 made of transparent glass. The interior space of the hood C is made with sufficient height to facilitate not only loading and unloading of foods and venting of fume, but also observation of the interior condition. The rack means installed on the top of the hood C allows draining of the fried foods without letting them cooled, and the drained oil dripping from the frame formed lattice plates 17 is guided by the slope surface of the wall member 2 into the oil bath in the pan proper P.

What is claimed is

1. A device comprising a food frying pan and a hood mounted thereon and covering the open area of said pan; said hood being formed of an inclined-mounted side wall member and a top wall member attached to a frame structure and embracing a space of an appropriate height over the open area of said pan, said frame structure having a lower portion and an upper portion, said side wall member being provided with a transparent portion and having an opening passage in one portion thereof for loading and unloading food to the interior area of said device, a door means for closing said opening passage and being hinged at its lower edge to said lower frame portion whereby said door means can be moved to a closed position leaning on the outside of said inclined-mounted side wall member, said top wall member being suspended from said upper frame portion at an appropriate distance therefrom, and said hood being provided with a first vent passage formed between said upper frame portion and said top wall member, and a second vent passage formed between a central opening of said top wall member and a disc suspended from said top wall member at an appropriate downward distance therefrom; a rack means installed on the top of said top wall member for the purpose of draining the dripping cooking oil therefrom; and an oil return means associated with said pan and said hood and utilizing the inclined surface of said top wall member for the purpose of returning the dripping oil splashes to the oil bath in said pan.

2. A device comprising a food frying pan having an open top area and a hood mounted on said pan and covering said open top area; said hood including a frame structure, a concically-shaped side wall member and a conically-shaped top wall member, said frame structure having an upper portion and a lower portion, said lower frame portion having a U-shaped channel surrounding said pan, the lower edge of said side wall member being supported in said U-shaped channel of said lower frame portion, said side wall member having a transparent portion for allowing the interior of said device to be viewed, said side wall member having an opening forming a passage therethrough for allowing food to be introduced or removed therefrom, a door member hingedly mounted on said side wall member for closing said food passage opening, said top wall member attached to said upper frame portion, a disc member mounted in a suspended manner from said top wall member, said top wall member having a central opening, passage a first vent formed between the outside edge of said top wall member and the edge of said upper frame portion for discharging the fumes and moisture produced within the interior of said device to the exterior thereof, and a second vent passage formed between said central opening of said top wall member and said disc member for also discharging the fumes and moisture produced within the interior of said device to the exterior thereof; rack means installed substantially parallel to and superimposed on said top wall member and adapted to drain oil drippings from the fried food temporarily placed thereon; and oil dripping return means associated with said device and utilizing the inclined surface of said top wall member for returning the dripping oil from said rack means to the oil bath in said pan.

3. A device according to claim 2 wherein a space is provided between the bottom edge of the side wall member and the top edge of said pan through which external air can be introduced into the interior of said pan.

4. A device according to claim 2 wherein said rack means is formed of a plurality of lattice plates.

5. A device according to claim 4 wherein said upper frame portion is formed with a downwardly turned outside portion and a horizontally inwardly projecting inside edge portion, said inside edge portion providing the support for said plurality of lattice plates.

* * * * *